United States Patent [19]
North et al.

[11] 3,922,442
[45] Nov. 25, 1975

[54] FLAME RETARDANT COMPOSITIONS

[75] Inventors: Joyce A. North, Somerset, N.J.; Gerard W. Kuckro, Cincinnati, Ohio

[73] Assignee: National Distillers and Chemical Corporation, New York, N.Y.

[22] Filed: Feb. 12, 1974

[21] Appl. No.: 441,926

Related U.S. Application Data

[60] Division of Ser. No. 258,679, June 1, 1972, Pat. No. 3,832,326, which is a continuation-in-part of Ser. No. 153,120, June 14, 1971, abandoned.

[52] U.S. Cl. .......... 428/447; 260/42.15; 260/42.29; 260/42.44; 428/389; 428/463
[51] Int. Cl. ............................................. C08f 45/04
[58] Field of Search........... 260/42.15, 42.39, 42.29, 260/42.43, 42.46; 117/232

[56] References Cited
UNITED STATES PATENTS

| | | | |
|---|---|---|---|
| 2,888,424 | 5/1959 | Precopio | 260/42.15 |
| 2,928,802 | 3/1960 | Rehner | 260/42.14 |
| 3,226,356 | 12/1965 | Kehr | 260/42.39 |
| 3,290,165 | 12/1966 | Iannicelli | 260/37 N |
| 3,563,939 | 2/1971 | Stevens | 260/37 SB |
| 3,741,929 | 6/1973 | Burton | 260/42.39 |

*Primary Examiner*—Joseph L. Schofer
*Assistant Examiner*—Paul R. Michl
*Attorney, Agent, or Firm*—Allen A. Meyer, Jr.

[57] ABSTRACT

Crosslinkable ethylene-vinyl acetate copolymer compositions containing silane-treated hydrated inorganic fillers illustrating improved moisture, heat resistance and flame retardance. An electrical conductor coated with such a copolymer composition is a particularly important application.

4 Claims, No Drawings

FLAME RETARDANT COMPOSITIONS

This application is a divisional of application Ser. No. 258,679, filed June 1, 1972, now U.S. Pat. No. 3,832,326, which is a continuation-in-part of Ser. No. 153,120 filed June 14, 1971, now abandoned.

BACKGROUND OF THE INVENTION

1. Field of the Invention

The invention relates to crosslinkable polymeric compositions illustrating inter alia, improved moisture, heat resistance and flame retardance particularly adapted for coating electrical wires and cable as well as for molding products requiring flame retardancy.

2. Description of the Prior Art

One of the most important areas where fire resistant polymer compositions find use is in the electrical environment, i.e., where both insulating and fire resistant properties are sought, most especially in the area of conductor insulation. Extrudable compositions presently available to the wire and cable art are required, for flame resistance, to contain halogenated polymers such as chlorinated polyethylene, polyvinyl chloride, chlorobutadiene, chlorinated paraffin, etc., together with antimony trioxide, both components being present in sizable quantities. Alternatively, a coating of chlorosulfonated polyethylene paint must be applied to a nonflame retardant insulating compound which constitutes an additional manufacturing operation.

For certain types of dry transformers, particularly high voltage transformers, a problem existed in that electrical failures occurred due to surface creepage of the organic insulating component used. The problem was solved through the addition of hydrated alumina to compositions whose organic binder consisted of butyl rubber, epoxy resins or polyester resins. However, these compositions do not possess a balance of excellent extrudability characteristics, physical and electrical properties, heat resistance and flame retardance. Such compositions are disclosed in U.S. Pats. 2,997,526–7 and 8, Kessel et al. The described compositions for such usage have poor tensile strength, elongation and percent elongation retained after ageing.

The art has further proposed that various layers of graded insulated cable be formed of crosslinked polyethylene and copolymers thereof, a silane and titanium dioxide. For instance, in U.S. Pat. 3,433,891 Zysk et al. it is taught that by altering the proportion of titanium dioxide in various layers of a graded insulation the specific inductive capacitance of the insulation can be varied. Such graded insulations are intended for high KV use, e.g., 69 KV, where water of hydration is unacceptable and where high vinyl acetate copolymers such as ethylene-vinyl acetate copolymers are contraindicated due to their harmful effect on high KV electrical properties at proportions much over 2 to 3%. The individual layers in a graded insulation such as Zysk et al. cannot be considered individually but must be viewed as a composite assembly. Incorporating hydrated alumina into such a graded material would render the same unsuitable for the high KV use of Zysk et al.

In the following description, all percentages and parts are by weight, unless otherwise indicated.

SUMMARY OF THE INVENTION

Fire retarding polymeric compositions exhibiting, inter alia, improved moisture and heat resistance consist essentially of an intimate mixture of at least one crosslinkable polymer containing as a major component an ethylene-vinyl acetate copolymer, one or more silanes and one or more hydrated inorganic fillers.

Such compositions have a unique combination, or balance, of improved physical and electrical properties together with a high degree of flame and fire retardance. These highly desirable results are achieved without the use of halogenated polymers such as polyvinyl chloride and chlorosulfonated polyethylene, thereby eliminating hydrogen chloride fumes; without carbon black, thereby permitting its use as colored insulations; without any flame retardant coatings such as are currently required, thereby eliminating an additional step in manufacturing operations when the compositions are used as, e.g., insulating compounds extruded onto a conductor; and without antimony trioxide, thereby eliminating a very expensive compound.

Such compositions find particular use as white (an inherent property) and colored uniinsulation compositions, which can be extruded over metal, e.g., copper or aluminum, conductors, to provide a single layer insulating and jacketing composition which is rated according to U.L. standards for 90°C. operation, and in some cases operation at temperatures as high as 125°, at up to 600 volts.

Insulating compositions of the present invention find particular utility in the insulation of building wire, appliance wire, and automotive wire where a unique combination of superior electrical properties combined with resistance to the degradative effects of heat and flame are essential, and where low smoke density and non-corrosive fumes are desirable.

DETAILED DESCRIPTION OF THE PREFERRED EMBODIMENTS OF THE INVENTION

The novel compositions of the present invention consist essentially of three components:
1. one or more crosslinkable or curable ethylene-vinyl acetate copolymers;
2. one or more silanes; and
3. one or more hydrated inorganic fillers.

The Crosslinkable Ethylene-Vinyl Acetate Copolymer Components

The terms crosslinkable or crosslinking are ascribed their normal art recognized meaning the the present application, i.e., they deonte the formation of primary valence bonds between polymer molecules.

Crosslinking can be accomplished by any of the known procedures such as chemical means including peroxide crosslinking; by radiation using cobalt - 60, accelerators, $\beta$-rays, $\gamma$-rays, electrons, X-rays, etc.; or by thermal crosslinking. The basic procedures for crosslinking polymers are extremely well known to the art and need not be described here in detail.

The polymeric component of the present composition is based upon an ethylene-vinyl acetate copolymer. The most preferred polymeric constituent is an ethylene-vinyl acetate copolymer per se containing at least about 9% vinyl acetate, balance ethylene. Amounts of vinyl acetate up to about 40% or higher can be used, but at amounts greater than about 28% vinyl acetate, tensile strength and ultimate elongation suffer.

Although little is gained, and some properties are even harmed, it is possible to include minor proportions of other crosslinkable polymers or copolymers in the composition of this invention. However, ethylene-vinyl acetate copolymers, as described above, should comprise at least about 66% of the total polymers present. Representative of such minor polymeric components which can be used in such non-preferred embodiments include polyethylene, copolymers of ethylene with propylene, butene, the acrylates and maleates, polydimethyl siloxane and polymethylphenylsiloxane, copolymers of vinyl acetate with the acrylates, etc. Obviously, mixtures of these minor polymeric components can be used.

Terpolymers of ethylene and vinyl acetate derived from, e.g., any of the corresponding monomeric materials listed above (other than ethylene or vinyl acetate) can be used. A representative terpolymer would be an ethylene-vinyl acetate-maleate.

The ethylene-vinyl acetate copolymers used in our invention preferably have a melt index of from about 1.0 to about 20.0.

The polyethylenes useful in the present invention include essentially all high, medium and low density polyethylenes as well as mixtures thereof. The most preferred polyethylenes for blending for use as uniinsulation for electrical wires and cables generally have a density of from about 0.900 to about 0.950 gm./cc. and a melt index of from about 1.0 to about 10.0.

Few reasons exist for using anything other than an ethylene-vinyl acetate copolymer per se, since this material is readily available at low cost. Moreover for some reason unknown at this time, the ethylene-vinyl acetate copolymer provides results superior to other polymers when combined with the silane and the hydrated inorganic filler.

More specifically, the compositions of the present invention provide a superior and unexpected balance of:
1. low temperature brittleness, i.e., the composition will not readily crack during low temperature movement (ASTM D 746).
2. heat resistance after ageing, i.e., excellent elongation after extended service at 90°C and even 125°C.
3. arcing and tracking resistance, as high as 5 KV, whereas even procelain shows surface breakdown at 4 KV. This property is not often required, however, in the preferred environment of under 600 volt service.
4. flame resistant and flame retardance.
5. moisture resistance, i.e., low mechanical absorption of water which yields a superior dielectric constant.
6. resistance to industrial chemicals.

It is not known why the compositions of this invention provide such a superior balance of properties. It is possible to theorize that there is some synergistic relationship between the ethylene-vinyl acetate copolymer, silane and hydrated inorganic filler, but there is no intention to be bound by such a theory. However, it has been established that for low voltage environments, less than 5000 volts, even more particularly for less than 600 volt environments, the compositions of this invention are superior to any known to the prior art for service as uniinsulation. Uniinsulation is an art accepted term denoting insulation where one layer is extruded around the conductor, and this one layer serves as the electrical insulation and the jacketing to provide physical and flame protection. The present compositions are especially adapted for service as uniinsulation in the under 5000 volt, most especially in the under 600 volt range, where only a single extruded coating is used, and it is in the environment that a superior balance of properties is required. It has been further found that ethylene-vinyl acetate copolymers will hold very large amounts of filler and still provide high flexibility and a high degree of crosslinking. The simultaneous achievement of high filler loading, flexibility and crosslinking is quite surprising as high flexibility and high crosslinking are generally believed incompatible, as are high crosslinking and high filler loading (which implies low crosslinkable polymer content). Ethylene-vinyl acetate copolymers further provide superior fire retardance to the polymeric compositions of the present invention.

The above described ethylene-vinyl acetate copolymers are preferably crosslinked by irradiation with high-energy electron beams or through the use of chemical crosslinking additives. Fully crosslinked, these polymers become thermoset in behavior.

Chemical crosslinking is accomplished by incorporating a crosslinking agent, e.g. dicumyl peroxide, into the ethylene-vinyl acetate copolymer. The peroxide is later activated during processing to link the ethylene-vinyl acetate polymer chains into a three-dimensional network (and other minor amounts of crosslinable polymer, if present).

The chemical crosslinking is carried out in accordance with procedures well known to the art, and variations in the general cross-linking conditions set out below will be apparent to one skilled in the art. The present invention is moreover, not limited to the use of tertiary organic peroxides for chemical crosslinking, and other art recognized materials which decompose to provide free radicals can be used. Obviously such crosslinking agents should not decompose during compounding of the composition, but the selection of acceptable cross-linking agents will be apparent to those skilled in the art.

Generally speaking, as the amount of crosslinking agent used increases, the degree of polymer crosslinking increases. Usually no more than 10% (based on polymer) of the organic tertiary peroxides need be used, with 3 to 6% being more typical values. Other crosslinking agents may require different amounts, but these can be readily determined. It is often advisable to avoid very low amounts of crosslinking agents, since some loss of resistance to deformation under sudden or continuous pressure may ensue. Crosslinking coagents such as triallylcyanurate and the like may also be included to increase the effectiveness of the crosslinking agent.

The tertiary organic peroxides, as with most other chemical crosslinking agents, are activated by heating to above their activation temperature whereupon decomposition thereof occurs. Any of the known procedures can be used to accomplish activation, e.g., high pressure steam application to the composition.

The art of radiation crosslinking is so highly developed that little need be said with respect to such procedures. As higher total doses of radiation are used, the degree of crosslinking generally increases, and for preferred crosslinkings a total radiation dose above 20 megarads will be used. Lower values are acceptable, but generally lower the amount of crosslinking. However, the dose should not be so high as to cause polymer degradation.

Crosslinking is generally conducted at superatmospheric pressures, e.g., on the order of 200 to 400 psi, although higher or lower pressures may be used. Pressure is employed to avoid uncontrolled porosity in the polymer, which would be highly undesirable in electrical insulation.

In general, the higher the degree of crosslinking the more resistant the polymeric composition is to moisture, chemical reagents, etc., and the less resistant the polymeric composition is to abrasion. At lower degrees of crosslinking there is also some loss of heat resistance as well as pronounced effect on percent elongation after ageing. The exact degree of crosslinking can, of course, be varied to take the above factors and their effect on the final product into account. Although higher or lower values can be used, for wire and cable insulation a crosslinking percentage on the order of about 95% for ethylene-vinyl acetate is generally preferred, determined by extraction weight of soluble components in the crosslinked polymer.

The Silane Component

One or more substituted silanes comprise the second essential component of the polymeric compositions of the present invention.

Any silane may be used in the present invention which will not adversely affect the desired balance of properties and which will help to bind the polymer and inorganic filler of the present invention, provided that the silane is not combustible, e.g., alkoxy and amine silanes, and does not interfere with polymer crosslinking or degrade during polymer processing.

The reasons why the silane components has such an unexpectedly favorable influence on the balance of properties of the present compositions are unknown. One might expect the silane to act merely as a mixing assistant, but if the silane is omitted, an inexplicable lowering of properties such as tensile strength and percent retention of elongation after ageing (a 4 to 5 fold decrease) results. There is no known theoretical basis for the surprising effect of silanes on the thermal properties of these polymeric compositions.

The preferred silanes used in forming the insulating compositions are the alkoxy silanes, e.g., lower alkyl-, alkenyl-, and alkynl-alkoxy silanes. Specific examples of such silanes are methyltriethoxy-, methyltris (2 methoxyethoxy)-, dimethyldiethoxy-, alkyltrimethoxy-, vinyltris (2 - methoxyethoxy)-, vinyltrimethoxy- and vinyltriethoxy- silane.

It is preferred to use the vinyl silanes for best results, and of the vinyl silanes the following are especially preferred:

gamma-Methacryloxypropyltrimethoxy-Silane

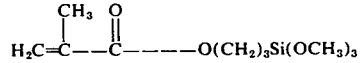

and

Vinyl - Tris(Beta-Methoxyethoxy) Silane
$H_2C = CHSi(OCH_2CH_2OCH_3)_3$

The Hydrated Inorganic Filler Component

The fillers used in the present invention are the hydrated inorganic fillers, e.g., hydrated aluminum oxides ($Al_2O_3 \cdot 3H_2O$ or $Al(OH)_3$). hydrated magnesia, hydrated calcium silicate. Of these compounds, the most preferred is hydrated aluminum oxide.

To obtain the superior balance of properties described, it is mandatory that a hydrated inorganic filler be used in formulating the polymeric compositions. It must be emphasized that large proportions of another type of filler, be it inert or not, cannot be added to the compositions and still achieve the superior balance of properties. For instance, replacing the hydrated inorganic filler wtih a comparable amount of titanium dioxide might increase flame resistance (merely by lowering the proportion of polymer present) but would adversely affect tensile strength and low temperature properties. Thus, the superior balance of properties has been lost. On the other hand, if one were to use the hydrated inorganic filler of this invention plus an equal amount of another filler, e.g., titanium dioxide, the superior balance of physical properties of our composition would suffer, e.g., percent retained elongation after heat ageing and tensile strength.

The water of hydration in the inorganic filler must be released during the application of heat sufficient to cause combustion or ignition of the ethylene-vinyl acetate copolymer. The water of hydration chemically bound to the inorganic filler is released endothermically. It has been found that the hydrated inorganic filler increased flame retardance in a manner far superior to other fillers previously used by the art to provide insulation with flame retardance e.g., carbon black, clays, titanium dioxide, etc. What is even more surprising is that flame retardance is combined with excellent electrical insulation properties at the high filler loadings used, since at these loadings the copolymeric composition contains a large amount of bound water.

The filler size is relatively non-important and may be in accordance with those sizes used by the prior art.

The Proportion of the Components

The amounts of the polymer and filler can be varied within wide proportions. However, the silane percentage should be in the range of from about 0.5 to 5.0 parts per 100 parts of filler. Lower amounts may be insufficient to provide adequate surface treatment while larger quantities could have an adverse effect on some of the physical properties, i.e., elongation, of an extruded insulating compound after crosslinking.

Best results are obtained in coating, e.g., extruding, onto electrical wires and cables when from 80 to 400 or more weight parts of filler (most preferable at least 125–150 weight parts), 0.5 to 5.0 weight parts of silane and 100 weight parts of polymer are present.

The compositions of the present invention may be formed in a number of ways. However, in every instance it is necessary that the filler and silane be intimately contacted. For instance, the preferred method of filler treatment is by direct addition of the silane to the polymer followed by addition thereto of the filler and other additives, if desired. This can be done in an internal mixer, such as a Banbury or Werner & Pfleiderer mixer. Alternatively, the silane may be added directly to the filler, dispersed therein, and the polymer than added.

Any processing device known to the art which insures an intimate mixture of all three essential components may be used, provided the silane is intimately and thoroughly dispersed onto the surface of the hydrated inorganic filler.

It will be apparent that in addition to the three essential components of the compositions of this invention, other additives may be present, e.g., pigments, stabilizers, antioxidants (e.g., polymerized trimethyldihydro quinoline) so long as they do not interfere with crosslinking, when desired, or harm desired properties. Such materials are present in very minor proportions, ranging from less than 10% of the polymer, and usually in amounts of less than 5%. There are two reasons amounts of other components are not desirable: firstly, the present composition per se has such superior properties; secondly, any significant amounts of other fillers for example, serve only to degrade or upset the balance of properties.

For the formation of insulation on conductors by extrusion, the most preferred embodiment of this invention, a fourth component is generally necessary, i.e., a lubricant such as a fatty acid soap or metallic derivative thereof. Such a material is also important to improve the stripping properties of wire insulation and thereby to permit the insulation to be easily stripped from the wire by the user to facilitate splicing and to make terminations. It is necessary to avoid, however, soaps which interfere with the crosslinking reaction (free radical mechanism) such as zinc stearate, which will react with organic peroxides. Acceptable soaps are the alkaline earth metal fatty acid soaps. A preferred soap is calcium stearate. Additional representative examples of useful lubricants include the alkaline earth metal salts and aluminum salts of stearic acid, oleic acid, palmitic acid and other fatty acids used by the art for this purpose, silicone oil, etc.

The following examples are provided to further illustrate certain aspects of this invention. In each instance the recited silane and filler ($Al_2O_3 \cdot 3H_2O$) were separately blended to intimately coat the silane onto the surface of the filler. Thereafter the silane/filler and the other additional components were added to the polymer and blended therewith. Care was taken to control the temperature rise during the mixing so as to not activate the peroxide prior to the completion of blending. Following mixing, the polymer composition was extruded onto a copper wire using a Brabender extruder and raised to the peroxide activation temperature by vulcanization in steam under high pressure.

Composition 1

| | |
|---|---|
| Ethylene-Vinyl Acetate (a) | 100.0 |
| Vinyl-Tris ($\beta$-Methoxyethoxy)Silane | 3.0 |
| Polymerized Trimethyldihydro Quinoline | 2.0 |
| $Al_2O_3 \cdot 3H_2O$ | 100.0 |
| Calcium Stearate | 2.0 |
| 65% 1,2 and 35% 1,3-Bis(Tert. Butyl-Peroxy-isopropyl)Benzene | 1.4 |
| | 208.4 |

(a) 17% Vinyl Acetate; 1.5 Melt Index

Composition 2

| | |
|---|---|
| Ethylene-Vinyl Acetate (a) | 100.0 |
| Vinyl-Tris ($\beta$-Methoxyethoxy) Silane | 3.0 |
| Polymerized Trimethyldihydro Quinoline | 0.5 |
| $Al_2O_3 \cdot 3H_2O$ | 125.0 |
| Calcium Stearate | 2.0 |
| 65% 1,2 and 35% 1,3-Bis(Tert. Butyl-Peroxy-isopropyl)Benzene | 1.7 |
| | 232.2 |

(a) 17% Vinyl Acetate; 1.0 Melt Index

Composition 3

| | |
|---|---|
| Ethylene-Vinyl Acetate (a) | 100.0 |
| Polymerized Trimethyldihydro Quinoline | 0.5 |
| $Al_2O_3 \cdot 3H_2O$ (Silane treated) (b) | 150.0 |
| Calcium Stearate | 2.0 |
| 1,4-Bis(Tert. Butyl Peroxy-isopropyl)Benzene | 1.7 |
| | 254.2 |

(a) 28% Vinyl Acetate; 3.0 Melt Index
(b) Vinyl-Tris ($\beta$-Methoxyethoxy)Silane Composition 3-continued

| | |
|---|---|
| Comparative Example (No Silane Addition) | |
| Ethylene-Vinyl Acetate (a) | 100.0 |
| Polymerized Trimethyldihydro Quinoline | 1.0 |
| $Al_2O_3 \cdot 3H_2O$ | 80.0 |
| Titanium Dioxide (b) | 5.0 |
| Calcium Stearate | 2.0 |
| 2,5-Dimethyl-2,5-di(t-Butylperoxy)Hexyne-3 | 6.0 |
| | 194.0 |

(a) 17% Vinyl Acetate; 1.5 Melt Index
(b) Added as a colorant

Flammability tests were then performed on the described compositions and several prior art resins. These are described below:

Limiting Oxygen Index Test

A Limiting Oxygen Index Tester (Model JD-14) was used to measure flammability in accord with ASTM D-2863. The oxygen index is defined as the minimum volume of oxygen in a slowly rising oxygennitrogen atmosphere that will sustain steady candle-like burning of a stick of polymeric material. The sample, in stick form, is supported vertically within the confines of a glass cylinder or chimney. An oxygen-nitrogen mixture filtered through glass beads enters the bottom of the cylinder and is allowed to flow upward through the tube. Glass tubing with a small gas flame at the orifice is inserted down through the chimney to ignite the top of the sample. Upon ignition, the flow of oxygen-nitrogen is carefully regulated to maintain a candle-like flame. The gas flow is controlled to determine the limit of flammability, which is the difference between complete burning of the sample or extinction. Since the flame burns downward from the top of the sample, heating by convection is practically eliminated. In this way the heated vapors rising during combustion cannot preheat the samples, and by varying the oxygen content it is possible to determine within one percent the minimum oxygen content to support combustion. In the Limiting Oxygen Index test, it is customary for samples to be prepared from slab stock, — in the case of thermoplastics a simple moded plaque or a cured plaque for the vulcanizable materials. However, for use in cables such materials must obviously be extruded over a conductor, usually copper or aluminum. It was thus necessary to introduce a new dimension to the LOI test in order to properly evaluate the burning behavior of a sample when it comprised a segment of insulated conductor with the conductor in place formed as heretofore indicated. 32 mil thick insulation on 14 gauge wire was used. The procedure followed was as described in the March 1970 issue of "Modern Plastics" at page 124.

Determinations of Limiting Oxygen Indices of Various Materials

| Slab Material | Oxygen Index |
|---|---|
| Composition 2 | 25.8 |
| Composition 3 | 28.0 |
| Kitchen candle | 16.0 |
| Polyethylene, low density | 17.0 |
| Polyethylene, high density | 17.5 |
| Polycarbonate, conventional clear | 28.0 |
| Polycarbonate, flame retardant (Lexan NB 155) | 43.5 |
| Polyphenyleneoxide | 29.0 |
| Polystyrene | 18.0 |
| Polysulfone, flame retardant | 39.0 |
| Coated Wire Material | |
| Polyvinyl chloride, Geon 101 (without plasticizer) | 45.0 |
| Composition 1 | 31.5 |
| Composition 2 | 37.0 |
| Composition 3 | 51.0 |
| Composition 4 (Comparative) | 28.0 |

Horizontal and Vertical Flame Test

Two other types of flammability test included the horizontal and vertical flame tests in accordance with the Underwriters Laboratories Method 83. Essentially, the horizontal test measures the ability of an insulation to minimize or limit the spread of flame and materials passing this test are considered slow-burning. The more severe vertical test measures the ability of an insulation to be self-extinguishing. In both cases, the flame temperature is on the order of 2,300°F.

Modified General Electric Dip Track Test

The Modified General Electric Dip-Track test, which strictly speaking, is not a flammability test, nonetheless determines the resistance to burning when a sample is ignited as the result of an electrical source generated from a high voltage arc. Tracking, per se, manifests itself at the surface of an insulation and will readily occur between areas of different electrical potential any time a semiconducting or conducting film coats the surface of an insulation. To accommodate insulations with excellent tracking resistance, modified General Electric equipment was used. First, a larger transformer (6KV) was employed. Secondly, the original nichrome wire, which serves as the high voltage electrode, was replaced by a nichrome loop in order to eliminate the tendency of the nichrome wire to puncture the insulation under test. For the low voltage electrode, a dilute aqueous solution of ammonium chloride (containing a non-ionic wetting agent) was used to supply the conducting film. The procedure otherwise followed is described in a paper entitled DIP - TRACK TEST by C. F. Wallace and C. A. Bailey, IEEE Electrical Insulation Group, Paper No. 31, pp. 66–360.

The results of the above tests are set out below.

Materials with an oxygen index ranging from 20 to 27 are considered as "slow-burning" and those with an oxygen index of 28.0 or higher are considered "self-extinguishing."

TABLE A

| | Compositions | | | |
|---|---|---|---|---|
| | 1 | 2 | 3 | 4 |
| U.L. Horizontal ASTMD-470 | P | P | P | P |
| U.L. Vertical ASTMD-2633 | P | P | P | F |
| Track Resistance (KV) | 4.8 | 4.4 | 5.0 | 3.8 |
| P = Pass | | | | |
| F = Fail | | | | |

Other properties of the above compositions were measured, and these are tabulated below:

TABLE B

| | Compositions | | | |
|---|---|---|---|---|
| | 1 | 2 | 3 | 4 |
| Brittleness Temp., °C | −52 | −57 | −43 | −32 |
| Water Absorp. (a) | 17.7 | 8.4 | 17.8 | 45 |
| Tensile psi | 2,100 | 2,250 | 2,400 | 2,150 |
| Elongation % | 300 | 240 | 200 | 425 |
| Aged | | | | |
| 7 days at 121°C | | | | |
| Tensile psi | 2,800 | 3,300 | 2,300 | 1,750 |
| Elongation % | 290 | 175 | 200 | 425 |
| 7 days at 160°C | | | | |
| Tensile psi | 2,900 | 2,900 | 2,400 | 1,550 |
| Elongation % | 270 | 140 | 160 | 325 |

(a) Mg/sq. in. after 7 days at 82°C.

From the above results, it can be seen that deletion of the silane has an adverse effect on the overall balance of properties.

In another series of runs compositions having the formulations set forth in TABLE C below were prepared by blending all of the components together in a Banbury mixer. Again care was taken to control the temperature rise during the mixing to avoid activation of the peroxide prior to completion of blending. The resulting polymeric compositions were pressed into standard ASTM slabs using a curing press. Properties of the slabs where there was no peroxide activation, i.e., no crosslinking, were then determined using the tests described above. This demonstrates what the properties are when the compositions are maintained as thermoplastic materials, i.e., the ethylene-vinyl acetate copolymer is non-crosslinked. The results are set forth below in TABLE D. In separate tests, the properties of other slabs of the compositions were determined after the slabs had been vulcanized under pressure to activate the peroxide and to achieve crosslinking of the polymer compositions The results are set forth below in TABLE E, which also shows, in the last two columns, the tensile and elongation values after ageing the slabs in an oven for 7 days at 150°C.

TABLE C

| | Compositions | | | | | | | | | |
|---|---|---|---|---|---|---|---|---|---|---|
| | 5 | 6 | 7 | 8 | 9 | 10 | 11 | 12 | 13 | 14 |
| Ethylene-Vinyl Acetate (a) | 100 | 100 | 100 | 100 | — | 100 | 100 | 100 | 100 | 100 |
| Polyethylene (b) | — | — | — | — | 100 | — | — | — | — | — |
| Al₂O₃. 3H₂O | — | 125 | — | 125 | 125 | — | — | — | 125 | — |
| Al₂O₃ (anhydrous) | — | — | — | — | — | — | — | 125 | — | — |
| CaSiO₃ | — | — | — | — | — | 125 | — | — | — | — |
| Calcined Clay | — | — | — | — | — | — | 125 | — | — | — |
| CaCO₃ | — | — | — | — | — | — | — | — | — | 125 |
| Alkoxy Silane (c) | — | — | 3. | 3. | 3. | 3. | 3. | 3. | — | 3. |
| Amino Silane (d) | — | — | — | — | — | — | — | — | 3. | — |
| Calcium Stearate | 2. | 2. | 2. | 2. | 2. | 2. | 2. | 2. | 2. | 2. |
| Antioxidant (e) | 2. | 2. | 2. | 2. | 2. | 2. | 2. | 2. | 2. | 2. |
| Peroxide (f) | 4.25 | 4.25 | 4.25 | 4.25 | 4.25 | 4.25 | 4.25 | 4.25 | 4.25 | 4.25 |
| | 108.25 | 233.25 | 111.25 | 236.25 | 236.25 | 236.25 | 236.25 | 236.25 | 236.25 | 236.25 |

(a) 17% Vinyl Acetate; Melt Index 1.3 (b) Low Density, Melt Index 4 (c) Vinyl-Tris (Beta-Methoxyethoxy) Silane (d) Gamma-amino-propyltriethoxy-Silane (e) Polymerized Trimethyldihydro Quinoline (f) 1,4-Bis (Tert. Butyl Peroxy-isopropyl) Benzene

TABLE D

| Composition | LTB,°C | Tensile (psi) | Elongation,% | LOI |
| --- | --- | --- | --- | --- |
| 5 | −76 | 1970 | 770 | 18.6 |
| 6 | −15 | 880 | 640 | 26.3 |
| 7 | −76 | 1720 | 760 | 17.6 |
| 8 | −20 | 870 | 620 | 26.3 |
| 9 | +23 | 1350 | 10 | 25.3 |
| 10 | +6 | 2080 | 20 | 23.1 |
| 11 | −20 | 1560 | 60 | 20.9 |
| 12 | −21 | 770 | 390 | 21.0 |
| 13 | −31 | 1320 | 150 | 26.3 |
| 14 | −50 | 1030 | 620 | 20.1 |

TABLE E

| Composition | LTB, °C | Tensile (psi) | Elong., % | LOI | After Aging Tensile (psi) | Elong., % |
| --- | --- | --- | --- | --- | --- | --- |
| 5 | −76 | 3000 | 510 | 17.3 | 4000 | 540 |
| 6 | −21 | 1340 | 400 | 29.9 | 1400 | 130 |
| 7 | −76 | 3250 | 480 | 17.3 | 2950 | 410 |
| 8 | −49 | 1990 | 210 | 25.8 | 2630 | 180 |
| 9 | −29 | 2110 | 100 | 23.8 | 2510 | 90 |
| 10 | −12 | 2720 | 40 | 23.2 | 3200 | 20 |
| 11 | −59 | 2950 | 110 | 20.8 | 3010 | 100 |
| 12 | −41 | 1520 | 130 | 24.6 | 1850 | 110 |
| 13 | −31 | 1830 | 210 | 27.3 | 2500 | 170 |
| 14 | −64 | 1770 | 440 | 22.8 | 1610 | 390 |

The above data show that the superior balance of properties as previously described, can only be obtained by utilizing a combination of ethylene-vinyl acetate copolymers, silane, and a hydrated organic filler.

While particular embodiments of this invention are shown above, it will be understood that the invention is obviously subject to variations and modifications without departing from its broader aspects. For example, non-crosslinked or crosslinked compositions of the invention may be utilized for many commercial applications as well as in many processing techniques where flame retardancy is important.

What is claimed is:

1. An electrical conductor coated with a uniinsulation layer comprising a crosslinkable polymeric component containing at least 66% by weight of an ethylene-vinyl acetate copolymer, a vinyl alkoxy silane, and from 80 to 400 parts of hydrated aluminum oxide containing chemically bound water per 100 parts of the polymeric component, said vinyl alkoxy silane being present in an amount of from 0.5 to 5 parts per 100 parts of hydrated aluminum oxide.

2. The conductor of claim 7 wherein said polymeric component is crosslinked.

3. The conductor of claim 1 wherein said ethylene-vinyl acetate copolymer contains from about 9 to 28% by weight of vinyl acetate.

4. The conductor of claim 1 wherein the vinyl alkoxy silane is vinyl-tris (beta-methoxyethoxy) silane.

* * * * *